March 25, 1969 P. J. GIELISSE ET AL 3,435,398
THERMISTOR DEVICE AND METHOD OF PRODUCING SAID DEVICE
Filed April 19, 1966 Sheet 1 of 2

INVENTORS
PETER J. GIELISSE
MANFRED DOSER
BY
ATTORNEY

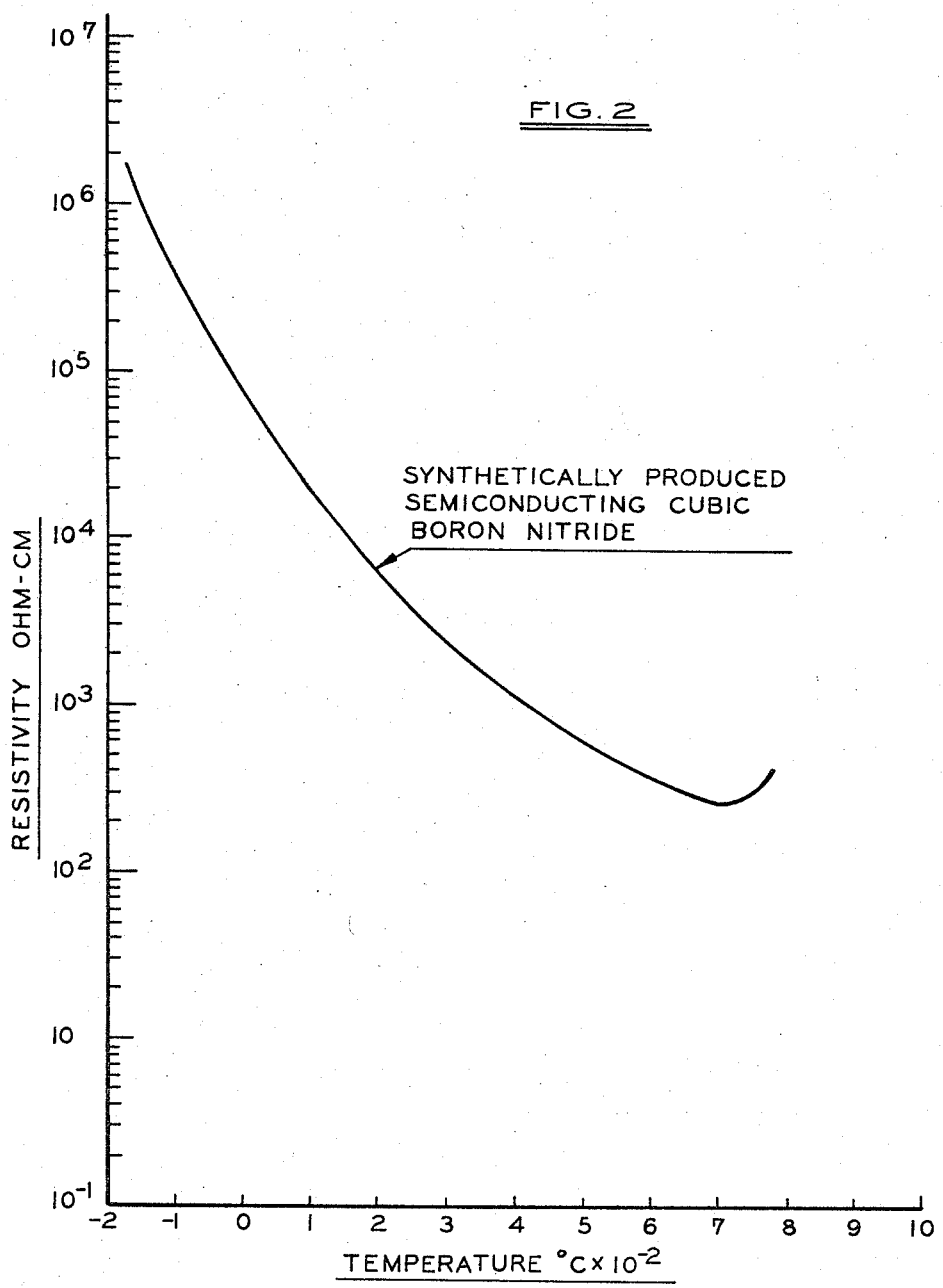

United States Patent Office 3,435,398
Patented Mar. 25, 1969

3,435,398
THERMISTOR DEVICE AND METHOD OF PRODUCING SAID DEVICE
Peter J. Gielisse, Bloomfield Hills, and Manfred Doser, Edmore, Mich., assignors to General Electric Company, a corporation of New York
Filed Apr. 19, 1966, Ser. No. 543,588
Int. Cl. H01c 7/04, 17/00; H01b 1/02
U.S. Cl. 338—22                                              11 Claims

ABSTRACT OF THE DISCLOSURE

A thermistor device in which the resistance material is single crystal cubic boron nitride. The thermistor has a coefficient of restivity in excess of 0.05 over a continuous temperature range including room temperature in excess of 500° C. The semiconducting cubic boron nitride crystal is doped with beryllium, sulfur, selenium, boron, silicon or germanium homogeneously distributed throughout the crystal and is bonded by ohmic contact to two electrically conductive leads.

---

Figure 1:
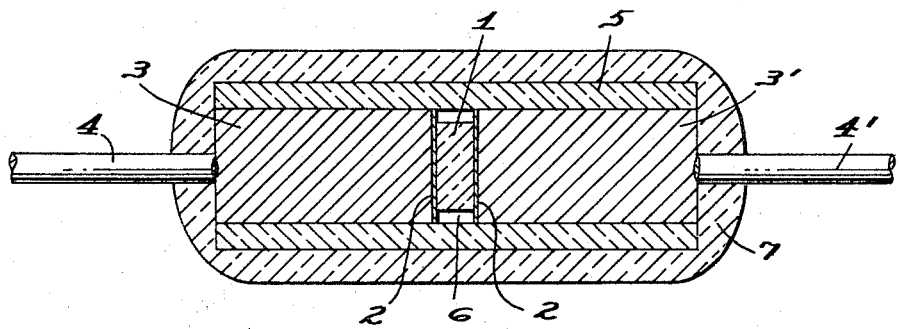

This invention relates to a thermistor, displaying a coefficient of resistivity over a useful continuous temperature range considerably in excess of any presently known thermistor device, in which single crystal cubic boron nitride is the resistance material.

Thermistors, or thermally sensitive resistors, are well known. They are prepared from a variety of semiconductor polycrystalline or single crystal materials, usually compressed metallic oxides, all of which display in one way or another a change of resistance with an increase in temperature in the negative, or in some cases in the positive, sense. Prior attempts to make thermistor devices with an extended temperature range of operation have utilized naturally occurring semiconducting diamond (see, for example, G. B. Rodgers, and R. A. Raal, Rev. Sci. Instr., vol. 31, p. 663 (1960)). The supply of naturally occurring diamonds, the semiconducting properties of which are for all practical purposes fixed, is extremely limited and drastically reduces their commercial utility in thermistor devices. Furthermore, and more significantly, naturally occuring diamond has never demonstrated useful thermistor characteristics over a temperature range materially greater than known thermistors. There is no known thermistor device available today which operates over a continuous temperature span greater than about 450° C.

It is an object of the present invention to provide a unique thermistor device capable of extending by as much as two to three times the effective thermal operating range of thermistors. It is an additional object of the present invention to provide a single thermistor device capable of continuous operation over temperatures ranging from cryogenic, that is from approximately 10° K., to temperatures as high as 750° C. It is still an additional object of the present invention to provide such a thermistor in which the resistivity is nearly a linear function of temperature over considerable portions of its operating ranges.

It is a further object of the present invention to provide a process for producing from a single materials system a thermistor device with a wide range of temperature sensitivity, response, and resistivity as well as extreme high- or low-temperature stability.

We have discovered that the foregoing and other objects of the invention may be achieved in a thermistor, possessing a negative temperature coefficient of resistivity, the sensing element of which is made from cubic boron nitride (borazon) single crystal into which very small proportions of a dopant material are introduced. The resistivity of the crystals may range from as low as $10^{-2}$ ohm cm. to as high as $10^{13}$ ohm cm. A single semiconducting borazon crystal typically changes about 500,000 ohms over the operating temperature range of the present thermistors. The thermistors are capable of operation over a temperature range from approximately minus 260° C. to as high as 750° C. and above. This result is particularly unusual in view of the fact that most of the conventional thermistor materials exhibit a useful maximum operating temperature of about 400° C. over the same range. The thermistors of the present invention possess commercially useful temperature coefficients of resistivity representing the percent change of resistivity per degree C. over a temperature span of at least 500° C. A commercially useful temperature coefficient of resistivity is generally greater than 0.05% and in most cases greater than 0.1%. Insofar as is known, no thermistor characteristics of this magnitude have even been previously produced from any available semiconductor material.

Figure 3:
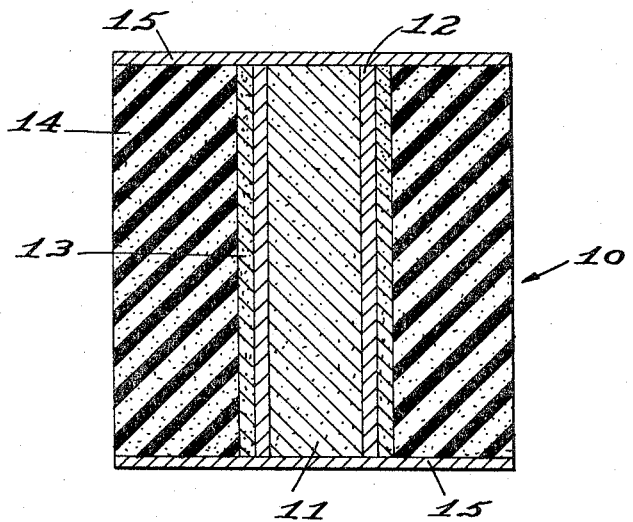

The invention will be better understood from the following description taken in connection with the accompanying drawing in which FIGURE 1 is a cross sectional view of a thermistor device of the invention;

FIGURE 2 illustrates the change of resistivity of the cubic boron nitride of the invention with temperature over an approximately 1000° C. temperature span; and FIGURE 3 is a cross sectional view of a typical reaction vessel used to prepare single crystal semiconducting boron nitride of the invention.

In its preferred form, the thermistor of the invention comprises a semiconducting single crystal of cubic boron nitride, a conducting bonding material located between and bonded to the single crystal and two conductive "headers," two electrically conductive leads attached to the headers, and a heat-resistant envelope surrounding and sealing the resistance element and leads. One such thermistor is illustrated in FIGURE 1 in which the crystal 1 in the shape of a platelet is bonded across opposite faces thereof by bonding material 2 to headers 3, 3'. The headers are in turn welded to electrically conductive leads 4, 4'. The crystal 1 and headers 3, 3' are encased in a high temperature glass envelope 5 which also seals off a non-oxidizing atmosphere 6 for the crystal 1. A refractory outer casing 7, which may be a refractory such as that sold under the trademark Pyroceram, envelops the entire assembly. The thermistor device shown in FIG. 1 is greatly enlarged for clarity. Normally the width of the cubic boron nitride platelet 1 ranges from about 300 to 500 microns.

The header material which may, for example, be the metal molybdenum or tungsten, effectively dissipates heat and as such acts as a heat sink during operation of the thermistor in certain applications. Moreover, molybdenum or tungsten bonds quite effectively to the glass or other refractory envelope in which the thermistor is enclosed and provides a match between the coefficient of expansion of the metal lead and glass in such a fashion that a satisfactory seal is obtained and maintained over the entire span of intended operating temperatures.

The choice of bonding material in the thermistor is critical. It must produce ohmic contact and it must possess the proper expansion characteristics and, of course, it must perform the very difficult feat of bonding borazon to the remainder of the assembly. The bond between the semiconducting crystal and the electrically conductive lead, or if a header is used, the bond between the crystal and the header material, should provide an ohmic or nonrectifying contact over the entire bonding surface of the crystal. The bonding material should have a coefficient of expansion equal to or greater than both the crystal and the refractory material in which the thermistor is encased. This is because almost every refractory material has a greater coefficient of expansion than cubic boron nitride. If the bonding material had a lower coefficient of expansion than the crystal or the refractory material, then at elevated temperatures there would be a loss of electrical contact or at least erratic electronic behavior not characteristic of the sensing element but rather of the resulting contact phenomena. The bonding material therefore compensates to a certain extent for the sharp difference in coefficient of expansion between the crystal and the glass or other material from which the envelope is made.

In its preferred form, the cubic boron nitride crystals from which the thermistors are made display two opposite parallel flat surfaces, as for example in the form of platelets, to which the electrically conductive leads are bonded. This configuration facilitates production and provides for reproducibility and commercially acceptable yields. Synthesis of the semiconducting crystals of the invention necessarily requires very precise control of growth conditions not only because of the foregoing shape requirements but also because it involves the introduction of homogeneously distributed very small but precise quantities of the so-called dopant into the host crystal, while the crystal itself is being grown under extremely high pressure and temperature conditions. In order to obtain the precise control over level and uniformity of dopant in the cubic boron nitride crystal, especially at the low levels required to produce commercially acceptable thermistor products, the crystals should be grown relatively slowly. Single crystal cubic boron nitride useful in the practice of the invention should be slowly grown from a mixture of hexagonal boron nitride, a homogenously mixed dopant material and a catalyst for borazon growth preferably at a pressure of from about 40 to 55 kilobars and a temperature of from about 1500 to 1900° C. It will, of course, be recognized that the choice of a pressure and temperature is dependent on the specific catalyst and dopant used, the required level of doping, the desired shape of the crystal and the degree to which reproducible properties are required for the thermistor devices. Generally, the introduction of a dopant into borazon during borazon growth is shown in U.S. Patent 3,078,232, Wentorf which issued on Feb. 19, 1963. The disclosure of this patent is herein incorporated by reference.

Dopants which may be used in preparing the semiconducting cubic boron nitride crystals of the invention may, for example, be beryllium, sulfur, selenium, boron, silicon, or germanium. The amount of dopant will ordinarily range from about 0.001% to about 1.0% by weight of the cubic boron nitride. These limits will vary within this range for a specific dopant and will also depend upon the desired electronic characteristics. The source of the dopant material is preferably a high purity dopant in its elemental form.

In order to obtain satisfactory thermistor characteristics, the dopant must be homogeneously dispersed throughout the crystal. To obtain such uniform dopant level, it is essential that the dopant be homogeneously dispersed throughout the growth system. If this homogeneous dispersal throughout the growth system is not attained, the dopant level in the crystals produced in the growth process will differ from crystal to crystal and within each crystal and as a result consistent temperature resistivity characteristics will not be obtained. For the foregoing reasons, it is preferred that the dopant be introduced during crystal growth as contrasted, for example, with introduction of a dopant by diffusion into the bulk crystal.

After preparing the semiconducting single crystals, the crystals, as well as the remaining components of the thermistor assembly, are cleaned, leads are attached to two faces of the crystals so as to produce ohmic contacts, and the crystals and leads are encapsulated in a refractory envelope in a nonoxidizing atmosphere. The refractory material should have a mechanical working temperature above the intended maximum operating temperature of the thermistor, preferably above 800°. The mechanical working temperature in the case of glass is represented by its strain point.

It has been found preferable to encapsulate the crystal and the immediately adjoining portion of the leads in a refractory envelope such as glass, to prevent oxidation from occurring in the bonding material for the crystal and in the weld area between header and lead, if a header is used. The envelope also serves to lend mechanical stability.

More specifically, the process of thermistor assembly is carried out as follows. All components of the thermistor assembly are first thoroughly cleaned chemically so as to remove catalyst or other impurity from the surface of the crystal. Such cleaning is necessary both in order to obtain a satisfactory mechanical bond to the crystal in the thermistor device and also to obtain the necessary stable and reproducible electrical characteristics in the thermistor. This may be accomplished by an initial cleaning of the crystal with a strong acid recleaning the crystal and cleaning the remaining thermistor components with suitable solvents to remove grease.

After cleaning, the lead may be directly attached to the surface of the crystal through a bonding material which may first be deposited on the header by evaporation, in the form of a slurry, or by placing a preformed alloy disc on the header and firing in a non-oxidizing atmosphere. Preferred crystal bonding and contacting alloys are palladium or palladium-nickel. Suitable materials from which the electrical leads themselves may be made are tungsten, molybdenum, or Kovar, a trademark for an iron-cobalt-nickel alloy.

The components of the thermistor, including the semiconducting crystal, the headers containing the deposited bonding material, and the leads and a glass tubing for encapsulation are then placed in a fusing station for assembly. The glass used for encapsulation must be a high temperature glass, such as Corning's aluminosilicate glass 1723 or equivalent. The fusing station should be purged so that the components of the thermistor are sealed in an atmosphere which is non-oxidizing. This atmosphere must be an inert gas such as argon, helium or nitrogen, an evacuated atmosphere or a reducing atmosphere such as hydrogen or forming gas. The gases should preferably be free of oxygen and moisture to achieve a dew point of preferably less than $-73°$ C. A pressure of from 5–3500 p.s.i.g. is then applied to the ends of the leads while the sides of the leads are supported if necessary, the specific pressure depending on the bonding material used. The components are then heated to the temperature required to seal the thermistor and bond the components into a composite device.

Finally, the composite assembly may be further encapsulated in a high temperature refractory material to protect the ends of the headers from excessive oxidation during operation of the thermistor at elevated temperatures. A suitable material for encapsulating the entire assembly is that sold under the trademark Pyroceram. However, any glass, capable of withstanding the operating temperature range of the thermistors, may be used.

The following examples illustrate the practice of the invention. A belt-type apparatus of the type disclosed in the aforementioned U.S. Patent 3,148,161 was used for crystal growth in Example 1.

Example 1

The reaction vessel 10 of FIG. 3 was used to prepare the cubic boron nitride. Hexagonal cubic boron nitride starting material 11 homogeneously mixed with a catalyst material and beryllium dopant was packed in a titanium tube 12. Around the titanium tube 12 and its contents was placed a snugly fitting carbon tube 13 which in turn was placed in a pyrophyllite tube 14. End caps 15 in the form of circular discs and made of titanium were placed across each end of the assembly and acted as conductors of the heating current to the titanium-graphite tube assembly. The hexagonal boron nitride had been previously mixed with lithium nitride ($Li_3N$) as catalyst and about 0.1% by weight of high purity elemental beryllium. This mixture of hexagonal boron nitride, catalyst and dopant was then prepressed to about 3000 to 8000 lbs. per square inch in the shape of a cylinder and fitted into the circular cavity bounded by the internal diameter of the titanium tube 12 and the end caps 15. The assembly 10 was then placed in the belt-type high-temperature high-pressure apparatus and the total assembly pressed for about 20 minutes at a pressure of 52 kilobars and a temperature of 1800° C.

After growth at the required temperature and pressure and stated time, the temperature was brought down to room temperature and the pressure slowly reduced to atmospheric. The semiconducting cubic boron nitride was then recovered from the reaction vessel. The cubic boron nitride was separated from the unconverted hexagonal boron nitride by dissolving the matrix in aqua regia. The cubic boron nitride was separated by hand.

Example 2

The cubic boron nitride crystals prepared as above were then size- and shape-separated. Particular shapes were grouped into sizes only microns apart. This close control is very essential for the manufacture of devices the characterisitcs of which, at least in part, depend on the actual size of the active element. The headers with the leads welded thereto were metal-coated with palladium. The crystals as well as the Kovar leads and metal-coated molybdenum headers and encapsulating glass were cleaned with an organic solvent to remove any grease or organic material.

The parts of the assembly—coated leads, crystal and glass in the form of a small cylinder—were assembled in appropriate fixturing and placed inside the hot zone of a heater element which was surrounded by a vacuum-tight gas shield, which enabled the bonding of the crystal and simultaneous sealing of the glass to the leads to be done in a reducing atmosphere of forming gas having a dew point of less than −73° C. to prevent oxidation of the leads and bonding material to promote oxide-free contact to the crystal as well as to provide a non-oxidizing environment in the crystal cavity. A pressure of 2000 p.s.i.g. was applied during the simultaneous bonding and sealing operation to bring about a complete and ohmic contact between crystal and header.

It is important that the sealing gas be free of any oxygen since any oxidation characteristics of the crystal would severely influence the electronic behavior of the element at the maximum operating temperatures for which the devices of the invention are intended to be used. The sealing temperature of the components in the present example was about 1150° C. but this temperature will vary depending upon the alloy and encapsulating material used. The entire heating and cooling cycle, including time for appropriate annealing of the encapsulating glass, typically lasts no longer than 60 seconds.

The device was then removed from the sealing fixture and a small amount of Pyroceram No. 45 ceramic slurry was applied around and slightly beyond the encapsulated area and dried. This was followed by a curing cycle at 750° C. for 5–15 minutes. The application of the second refractory coating was only for purposes of protecting from oxidation the area where the leads are joined to the header and was therefore applied in this specific configuration. The Kovar leads were then cleaned of their oxide coating and plated with chromium. This has been found vrey effective in protecting the Kovar leads at the operating temperatures of the device for extended periods of time.

We have also successfully used leads made from precious metals such as platinum or palladium as well as base metals clad with a precious metal such as palladium-clad molybdenum. In these cases no protective chromium coating is needed.

The thermistor devices of the present invention should expand manyfold the usefulness of thermistors in general. This is a result not only of the wide operating temperature range of the present thermistors, but also because of their greater thermal environmental stability and because they possess relatively linear resistivity versus temperature characteristics.

Furthermore, thermistors of the invention possess the additional advantage of a virtual absence of any significant polarity effects or rectifying characteristics. In addition, the thermistors possess very high thermal conductivity, resulting in excellent device responsivity. They are made of one of the hardest substances known, thus enhancing their capability of withstanding extremes of pressure. They possess extremely high resistance to chemical attack and abrasion. They possess a very high Debye temperature, implying low frequency thermal motion and as such are less subject to intrinsic thermal interference effects.

Thermistor devices containing single crystal diamond as the resistance material are the subject of our copending application Ser. No. 543,649 filed of even date herewith and assigned to the same assignee as the present invention.

The foregoing is a description of an illustrative embodiment of the invention, and it is applicants' intention in the appended claims to cover all forms which fall within the scope of the invention.

What we claim as new and desire to secure by Letters Patent of the United States is:

1. A thermistor device comprising a semiconducting cubic boron nitride single crystal and two electrically conductive leads bonded to said crystal to provide ohmic contact therewith, said crystal being sealed in a non-oxidizing atmosphere with a refractory material, said crystal having homogeneously distributed throughout a dopant material selected from a group consisting of beryllium, sulfur, selenium, boron, silicon and germanium in an amount ranging from about 0.001% to about 1% by weight of the cubic boron nitride, said thermistor having a coefficient of resistivity in excess of 0.05 over a continuous temperature range including room temperature in excess of 500° C.

2. The thermistor of claim 1 in which the electrically conductive lead is bonded to said crystal through a header material.

3. The thermistor of claim 1 in which the refractory material is glass having a strain point above approximately 800° C.

4. The thermistor of claim 2 in which the header material is selected from the group consisting of molybdenum and tungsten.

5. The thermistor of claim 1 in which the crystal, as well as the adjoining portion of the electrically conductive lead are encapsulated in a refractory material.

6. A thermistor device comprising a cubic boron nitride single crystal, said crystal having at least two opposite parallel flat surfaces to each of which is bonded an electrically conductive lead having ohmic contact with said crystal, said crystal having homogeneously distributed throughout a dopant material selected from a group consisting of beryllium, sulfur, selenium, boron, silicon and germanium in an amount ranging from about 0.001% to about 1% by weight of the cubic boron nitride, said thermistor having a coefficient of resistivity in excess of 0.05 over a continuous temperature range including room temperature in excess of 500° C.

7. The thermistor of claim 6 in which the crystal is in the shape of a platelet.

8. The thermistor of claim 6 in which the crystal is bonded to the lead with a metal selected from the group consisting of palladium and a palladium alloy.

9. A process of producing a thermistor comprising slowly growing a cubic boron nitride crystal having at least two opposite parallel flat surfaces from hexagonal boron nitride at a pressure of from about 40 to 55 kilobars at a temperature of from about 1500 to 1900° C. in the presence of a dopant material homogeneously mixed with a catalyst for borazon growth and recovering semiconducting borazon therefrom having homogeneously distributed throughout a dopant material selected from the group consisting of beryllium, sulfur, selenium, boron, silicon and germanium in an amount ranging from about 0.001% to about 1% by weight of the cubic boron nitride, and bonding two electrically conductive leads to said crystal to provide ohmic contact therewith, said thermistor having a coefficient of resistivity in excess of 0.05 over a continuous temperature range including room temperature in excess of 500° C.

10. A process of producing a thermistor comprising growing a semiconducting cubic boron nitride single crystal, said crystal having homogeneously distributed throughout a dopant material selected from a group consisting of beryllium, sulfur, selenium, boron, silicon and germanium in an amount ranging from about 0.001% to about 1% by weight of the cubic boron nitride, cleaning said crystal to remove substantially all impurities from the surface thereof, attaching two electrically conductive leads to said crystal to provide ohmic contact with said crystal, and encapsulating in the presence of a non-oxidizing atmosphere said crystal and the adjoining portion of said leads in a refractory envelope.

11. A process of producing a thermistor comprising growing a semiconducting cubic boron nitride single crystal, said crystal having homogeneously distributed throughout a dopant material selected from a group consisting of beryllium, sulfur, selenium, boron, silicon and germanium in an amount ranging from about 0.001% to about 1% by weight of the cubic boron nitride, cleaning said crystal to remove substantially all impurities from the surface thereof, bonding conductive leads to opposite surfaces of said crystal while said leads are forced against said surfaces by applying a pressure of from 5 to 3500 p.s.i.g. through said leads, the bond between said crystal and said leads providing ohmic contact with said crystal and encapsulating, in the presence of a non-oxidizing atmosphere, said crystal and the adjoining portion of said leads in a refractory envelope.

References Cited

UNITED STATES PATENTS

| | | | |
|---|---|---|---|
| 2,271,774 | 2/1942 | Megow et al. | 29—619 X |
| 2,700,720 | 1/1955 | Torok | 29—619 X |
| 3,037,266 | 6/1962 | Pfister | 29—619 X |
| 3,078,232 | 2/1963 | Wentorf | 252—518 X |
| 3,141,847 | 7/1964 | Wentorf | 252—518 X |
| 3,220,097 | 11/1965 | Griest | 29—619 |
| 3,221,393 | 12/1965 | Sapoff et al. | 29—612 |
| 3,329,917 | 7/1967 | Bolognesi | 29—612 |
| 3,341,473 | 9/1967 | Lock | 338—22 X |

FOREIGN PATENTS 776,970    6/1957    Great Britain.

REUBEN EPSTEIN, *Primary Examiner.*

U.S. Cl. X.R.

29—612; 252—512, 518